United States Patent
Wu et al.

(10) Patent No.: US 9,672,434 B2
(45) Date of Patent: Jun. 6, 2017

(54) VIDEO-BASED SYSTEM AND METHOD FOR PARKING OCCUPANCY DETECTION

(71) Applicant: Xerox Corporation, Norwalk, CT (US)

(72) Inventors: Hao Wu, Pittsford, NY (US); Robert P. Loce, Webster, NY (US); Yao Rong Wang, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 95 days.

(21) Appl. No.: 14/805,608

(22) Filed: Jul. 22, 2015

(65) Prior Publication Data
US 2017/0024619 A1    Jan. 26, 2017

(51) Int. Cl.
| G06K 9/00 | (2006.01) |
| G06K 9/46 | (2006.01) |
| G06K 9/52 | (2006.01) |
| G06T 5/00 | (2006.01) |

(52) U.S. Cl.
CPC ....... G06K 9/00812 (2013.01); G06K 9/4652 (2013.01); G06K 9/4661 (2013.01); G06K 9/52 (2013.01); G06T 5/00 (2013.01)

(58) Field of Classification Search
CPC ............. G06K 9/00812; G06K 9/4652; G06K 9/4661; G06K 9/52; G06K 9/00771; G06K 9/00778; G06T 5/00
See application file for complete search history.

(56) References Cited

U.S. PATENT DOCUMENTS

| 2005/0122397 | A1* | 6/2005 | Henson | G06K 9/00771 |
| | | | | 348/143 |
| 2011/0170744 | A1* | 7/2011 | Malinovskiy | G06K 9/00785 |
| | | | | 382/103 |
| 2011/0317009 | A1* | 12/2011 | Kumaraswamy | G06K 9/00744 |
| | | | | 348/143 |
| 2013/0195317 | A1 | 8/2013 | Kim et al. | |
| 2013/0265419 | A1 | 10/2013 | Bulan et al. | |
| 2014/0368652 | A1 | 12/2014 | Wang | |
| 2014/0375804 | A1 | 12/2014 | Bulan et al. | |
| 2014/0376769 | A1 | 12/2014 | Bulan et al. | |
| 2015/0086071 | A1 | 3/2015 | Wu | |
| 2015/0278609 | A1 | 10/2015 | Wu et al. | |

FOREIGN PATENT DOCUMENTS

| EP | 2172903 A1 | 4/2010 |
| JP | 2009157492 | 7/2009 |

OTHER PUBLICATIONS

Hoover et al. "A Real-Time Occupancy Map From Multiple Video Streams." IEEE International Conference on Robotics and Automation, May 10, 1999.*
U.K. Search Report under Section 17, dated Jan. 11, 2017, in connection with Application No. GB1612250.9, filed Jul. 14, 2016.

* cited by examiner

Primary Examiner — Jon Chang
(74) Attorney, Agent, or Firm — Fay Sharpe LLP

(57) ABSTRACT

A spatiotemporal system and method for parking occupancy detection. The system can generally include suitable image acquisition, processing, transmission and data storage devices configured to carry out the method which includes generating and processing spatiotemporal images to detect the presence of an object in a region of interest, such as a vehicle in a parking stall.

17 Claims, 13 Drawing Sheets

VIDEO-BASED SYSTEM AND METHOD FOR PARKING OCCUPANCY DETECTION

BACKGROUND

The present disclosure relates to a system and method for creating a spatiotemporal image representation with information content that enables accurate and rapid processing for detection of objects, events or activities. The disclosure finds particular application in connection with spatiotemporal (ST) image representation of a sequence of video images. However, it is to be appreciated that the present exemplary embodiments are also amendable to other like applications.

In the computer vision community, spatiotemporal processing techniques have recently gained more attention. Different methods have been proposed and studied by researchers for various applications.

Videos are usually viewed and processed by humans in a sequential mode, where each 2-D video frame (with 2 spatial dimensions) is played in a timely order. Traditional spatiotemporal representations of videos are usually obtained by stacking 1-D (spatial dimension) signals obtained from each 2-D video frame in their time orders. Therefore, the resulting 2-D ST images are composed by one spatial dimension and one time dimension. One traditional way to obtain the 1-D spatial dimension signals is to extract a row or column from the same location in each video frame, where the axis of the row or column becomes the spatial dimension. Successive frames yield successive extractions, which are time-order stacked to form a 2-D ST representation. Another known method for producing an ST representation from a video sequence projects (summarizes or averages) the whole or part of each 2-D video frame along one spatial dimension to reduce the image frame having 2-D spatial dimensions to a signal that is of one spatial dimension, and the sequence of 1-D signals resulting from the extractions are stacked to form the 2-D ST image.

Many existing applications using spatiotemporal representation of videos are focused on characterizing camera motion. One approach is directed at how to extract camera motion velocity that corresponds to an orientation in spatiotemporal space using a set of quadratic pairs of linear filters. Examples consist of rigid patterns moving constantly in one direction with no background clutter. Other approaches have relied on different algorithms to estimate camera motion in the spatiotemporal domain. In one approach, video tomography is used to extract lens zoom, camera pan and camera tilt information from a video sequence using the Hough transform to compute a linear camera model in the spatiotemporal images. A similar method analyzes a video sequence to characterize camera motion and involves determining a 2-D spatiotemporal representation wherein trace lines are determined by quantizing the 2-D spatiotemporal representation and finding boundaries between the quantized regions. Camera motion is then inferred by analyzing the pattern of the trace lines using Hough transforms.

Some other attempts have been directed at trying to detect moving objects in a constrained situation, where objects usually move at a constant velocity in front of a static camera. These algorithms often involve detecting straight lines or planes by using the Hough transform. In one example, the gait patterns generated by walking humans are analyzed using XT (spatiotemporal) slices. The Hough transform is then used to locate the straight line patterns in XT slices. In another example, a perceptual organization-based method is used to describe the motion in terms of compositions of planar patches in the 3-D spatiotemporal domain.

Yet another approach is directed at analyzing object motion in less constrained videos using spatiotemporal slices. This method involves using structure tensor analysis to first estimate the local orientation in each spatiotemporal slice. A 7-bin 2-D tensor histogram is then formed and the detected dominant motion is used as the background motion to reconstruct the background image in the spatial domain. Background subtraction is then used to roughly detect the foreground objects, and the results are further refined using color information.

More recently, researchers have started to use spatiotemporal features which are obtained directly from 3-D video volume to assist action/activity/behavior detection and recognition.

Other than applications in characterizing camera motion, detecting/tracking a moving object and representing local volume features, spatiotemporal related methods are also used in video stabilization, visual attention extraction, block matching, parked car detection and human counting, for example.

One application in which computer vision algorithms are becoming important is in video-based parking occupancy detection systems. Previous methods of parking occupancy detection have employed machine-learning based applications that typically involve an offline training phase that could be time consuming in acquiring vehicle and background samples. In addition, the on-line video processing phase of these methods can be slow when computational power is limited.

Many approaches for parking occupancy detection are directed to parking lot occupancy detection. Compared to other sensors that have been adopted in different occupancy detection applications (for example, ultrasonic sensors, laser scanners, radar/Lidar/ground radar sensors, magnetic field sensors, passive infrared sensors, microwave sensors, piezoelectric axle sensors, pneumatic road tubes, inductive loops, weight-in-motion systems and Vehicle Ad Hoc Networks (VANETs) based systems etc.) camera sensing has its advantages and disadvantages when used for occupancy detection. In general, cameras provide more abundant information of the parking lots/spaces than other sensors, which makes it possible to integrate other tasks, such as license plate detection/recognition, vehicle type classification, vandalism/loitering detection and law enforcement etc., in one system. Using cameras is also likely to reduce the costs of a system due to their wide sensing range. Convenience to install the systems is also one advantage of camera-based methods. However, camera-based systems usually require more computational resource than other sensor-based methods and hence it requires more energy supply. These requirements have generally prohibited large scale deployment of camera sensors for parking occupancy detection.

There are different video/image based parking occupancy detection methods that have been proposed. However, most of these methods are based on 2D spatial processing, which in general must accommodate more noise and variations comparing to processing in the reduced dimension domain—spatiotemporal-based processing. In the prior systems, the computer algorithms have not been fast and light enough to be embedded inside cameras. As such, video data have to be transferred to a data processing center. This process delays data processing and often it involves VPN rental to transfer data, which adds to operation cost. One day's video from one camera is on average about 10 GB. It takes a lot of network/storage resources to transfer every day's video data to the data processing center. Even after data has been transferred to a server, the processing speed of the above mentioned video-based occupancy detection is slow for large scale deployment. In one application, six computers are used for data storage and one server is used to process the data from three cameras. Data transmission delay is on average about 2 minutes. One server can barely process the data streams from three cameras in real-time (2.5 fps×3). This kind of centralized system is not cost efficient.

INCORPORATION BY REFERENCE

The following references, the disclosures of which are incorporated by reference herein in their entireties are mentioned:

U.S. application Ser. No. 14/805,710, filed Jul. 22, 2015, by Wu, et al., entitled "System and Method for Spatiotemporal Image Fusion and Integration"; and, U.S. application Ser. No. 14/033,059, filed Sep. 20, 2013, by Wu, et al., entitled "Methods and Systems for Efficiently Monitoring Parking Occupancy".

BRIEF DESCRIPTION

Aspects of the present disclosure are directed to an ultrafast and ultralight video-based solution for parking occupancy detection. The current video-based parking solutions are not fast and efficient for large scale deployment and hence create problems in data transmission, data storage and processing steps. In order to deploy a video-based parking occupancy system on a city-wide scale, the video analytics operations should be moved into the camera or some separate computing device attached directly to camera. All computing should be local, transmitting primarily the result. To realize this distributed system, the video analytics algorithm has to be extremely efficient in both speed and memory usage.

The present disclosure sets forth a spatiotemporal system and method for parking occupancy detection. The overall system can generally comprise suitable image acquisition, processing, transmission and data storage devices configured to carry out the method, which can include some or all of the following steps:

(1) Acquire a temporal sequence of image frames (i.e., video sequence) and perform pre-processing when needed;

(2) Define the parking ROI and perform geometric transformation to correct view distortion when needed;

(3) Sample multiple lines of data in the parking ROI from the video frames/image sequences;

(4) Stack the lines to form multiple spatiotemporal (ST) images;

(5) Perform temporal and/or spatial noise reduction on the ST images (optional)

(6) Perform joint chromatic transformation to reduce illumination variations in the ST images (optional);

(7) Analyze the ST images to obtain the occupancy data in the corresponding parking ROI.

As compared to prior art approaches, the system and method of the present disclosure is computationally fast, memory efficient, has better scalability on parking types, street shape and camera view angles (parallel or angled parking, straight or curved street, high or low camera positions, etc.), broader applications on different occupancy detection scenarios including on-street parking detection, parking lot occupancy detection, and heavy goods vehicles (HGV) parking occupancy detection, all without re-training.

The system and method of the present disclosure is not vehicle specific (e.g., not trained on vehicles). As such, aspects of the present disclosure can be used for non-vehicle occupancy detection, such as seat occupancy detection at stadium, classroom and theatre, etc.

In accordance with one aspect, a computer implemented method for detecting occupancy of a space comprises acquiring a sequence of images of the space, extracting at least one vector of data from the same location in each of the images, generating at least one spatiotemporal image with the vectors of data extracted from each image, and analyzing the at least one spatiotemporal image to obtain occupancy data of the space.

The extracting at least one vector of data from the same location in each of the images can further comprise extracting at least three vectors of data from substantially different portions of each respective image. The method can also comprise performing temporal noise reduction on the at least one spatiotemporal image prior to the analyzing and/or performing spatial noise reduction on the at least one spatiotemporal image prior to the analyzing. The method can further include defining the three vectors of data to be three color data components, transforming the three color data components to a device independent color space, and analyzing non-lightness components of the transformed data to determine vehicle occupancy. The method can also include defining the three vectors of data to be respective red, green, and blue color data components, transforming the color data components to a hue-saturation color space, and analyzing the hue-saturation components of the transformed data to determine vehicle occupancy.

In one exemplary embodiment, the analyzing can include comparing a saturation value of at least one pixel of the spatiotemporal image to a threshold value and, if above the threshold, generating an output indicative of occupancy of the space corresponding to the at least one pixel. The analyzing can include detecting horizontal intensity changes in the at least one spatiotemporal image. The method can further include generating a plurality of spatiotemporal images, each spatiotemporal image comprised of vectors of data extracted from the same location in each of the sequence of images. The analyzing can include calculating a color difference of respective at least one pixels in at least two of the spatiotemporal images, determining the maximum absolute difference between per pixel between at least two spatiotemporal images and comparing the difference to a threshold to obtain occupancy data, or subtracting a first spatiotemporal image from a second spatiotemporal image and comparing the difference to a threshold to obtain occupancy data.

In accordance with another aspect, a system for video-based detection occupancy of a space includes a memory in communication with a processor configured to perform one or more the methods disclosed herein.

DETAILED DESCRIPTION

The present disclosure will be described in connection with a computer vision system and method for a parking occupancy system. It should be appreciated, however, that the present disclosure is not limited to any particular application, and that aspects of the disclosure can be applied as a preprocessing step in many of the spatiotemporal related works mentioned above. That is, the present disclosure, although described in the context of a parking occupancy system, is not limited to a parking occupancy system.

Figure 1:
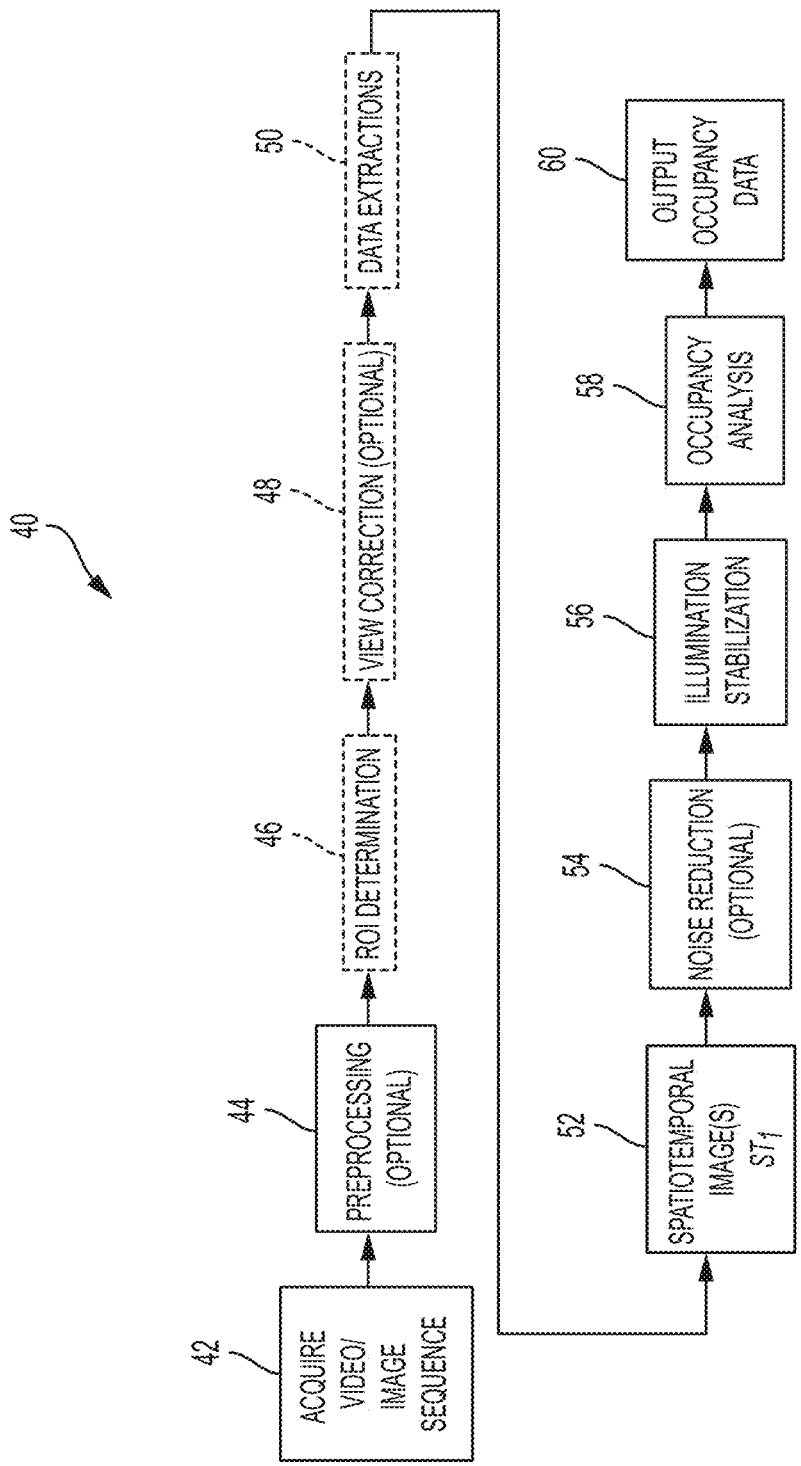
FIG. 1 is a process flow diagram illustrating an exemplary method in accordance with the present disclosure.

With reference to FIG. 1, an exemplary embodiment of the present disclosure is illustrated. The method 40 generally comprises the following steps:

Acquire a temporal (or other) sequence of image frames in process step 42 (i.e., video sequence);
Perform pre-processing in process step 44 as needed
Define/determine the parking region of interest (ROI) in process step 46;
Perform geometric transformation to correct view distortion in process step 48 as needed;
Sample one or multiple lines of data (also referred to as a vector) in the parking ROI from the video frames/image sequences in process step 50;
Stack the lines of data to form one or multiple spatiotemporal (ST) images in process step 52;
Perform temporal or/and spatial noise reduction on the ST images in process step 54, as needed;
Perform illumination stabilization which can include joint chromatic transformation to reduce illumination variations in the ST images in process step 56;
Analyze the ST images to obtain the occupancy data in the corresponding parking ROI in process step 58;
Output occupancy data in process step 60.

Each of process steps 42-60 will be described in detail in the following paragraphs and in connection with FIGS. 2-12.

Process Steps 42 and 44—Acquire a Temporal (or Other) Sequence of Image Frames (i.e., Video Sequence) and Perform Pre-Processing when Needed.

Spatiotemporal image representation and processing starts with a sequence of temporally related image frames, extracts spatial information from each frame or representative frames and stacks the information to form a representation of the set of video frames. The video frames can be acquired using any of a variety of video cameras, such as Red/Green/Blue (RGB), Near Infrared (NIR), Thermal, fish-eye, monochromatic, etc. Frame rates will vary depending on the application, while many common cameras typically will operate at 30 frames/second. Videos or image sequences can be pre-processed for some purposes, such as lens distortion correction, noise reduction, contrast enhancement, shadow removal etc. This pre-processing is optional but can be useful in some applications to improve efficiency and/or accuracy detection.

It should be appreciated that the frames need not be a temporal sequence acquired at a fixed temporal interval. The interval may be varied according to various events, such as events occurring in the video, lighting changes, and bandwidth capabilities of the camera and a possible network infrastructure. Varying the interval can provide certain advantages. For example, if there isn't any activity of motion detected in the video sequence, frames with no relevant activity can be ignored (e.g., not used for creating a stack). Eliminating frames without motion can prevent false detections in the stacked images. Also, it can save processing time, when processing the ST image. In some applications, it may be advantageous to have frames wherein lighting changes are evident, such as a cloud blocking the sun, shadows moving with the sun, street lights and other lights coming on. Having many frames around (before and/or after) such changes can allow those images changes to be better distinguished from the change that occurs when a vehicle enters or exits a parking spot.

Even more generally, the image frames may only be related in some way (e.g., other than temporally related). For example, the image frames could be a series of images taken along the length of a street, stadium, walkway, etc., wherein the images are related as a sequence in space. Creating a stacked image from these types of frames does not create a literal spatio"temporal" image. The image is a stacked image, however, and can be processed in a similar manner to a typical ST image. Whereas a temporal stacking will give a representation of image activity (e.g., parking enters/exits) over time, a spatial stacking gives a representation of distance (e.g., vehicle presence over a long street). The spatial sequence could come from multiple cameras acquiring images along, for instance, a street. Or, a camera, such as a Pan Tilt Zoom (PTZ) camera could adjust view angles and zoom to give different views along a street in a sequence of video frames.

The image frames can be acquired directly from a camera. In some embodiments, the image frames may have been originally acquired by a camera, stored and then extracted from a storage device for processing in accordance with the present disclosure.

Process Steps 46 and 48—Define/Determine the Parking ROI and Perform Geometric Transformation to Correct View Distortion when Needed.

Figure 2A:
FIG. 2(A) is an image including an exemplary designated region of interest.
Figure 2B:
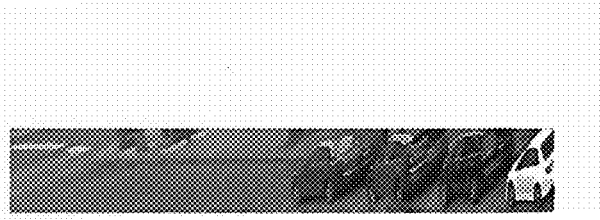
FIG. 2(B) is a corrected view of the region of interest of FIG. 2(A)
Figure 2C:
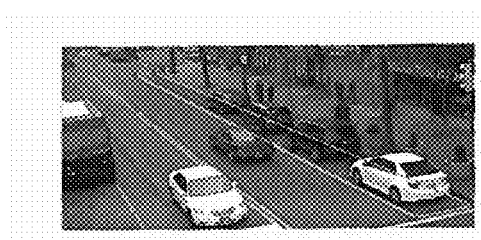
FIG. 2(C) is an image including another exemplary designated region of interest.
Figure 2D:
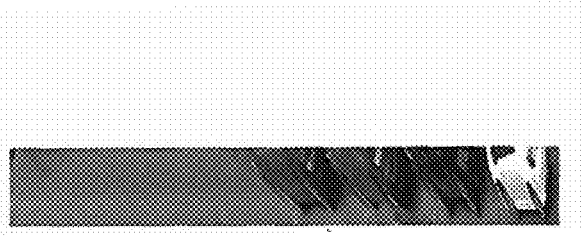
FIG. 2(D) is a corrected view of the region of interest of FIG. 2(C)

With reference to FIGS. 2(A)-2(D), an illustration of ROI determination and subsequent view correction is shown. In FIG. 2(A), the ROI is defined to reflect a side view of parked vehicles. In FIG. 2(B), the corrected side view of the parking ROI is shown. The correction to the side view includes rotating the image such that the parking spaces extend generally horizontally across the image. As will become apparent, a slice taken horizontally across the image will therefore include data regarding each parking space. FIG. 2(C) shows another example of a parking ROI, which reflects the ground parking spaces. FIG. 2(D) shows the corrected ground view of the parking ROI of FIG. 2(C). The view correction could make the following processing described herein easier for some parking occupancy detection applications, such as defining each parking spot for demarcated parking spaces.

It should be appreciated that process step 46 and/or 48 are initialization steps. That is, these steps generally only need to be performed once for a specific camera setting. In the exemplary view shown in FIGS. 2A-2D the quadrilateral ground parking ROI is defined by manually selecting the four corners of the quadrilateral. There are different ways to define the parking ROI. FIGS. 2A-2B show two exemplary ways to define the ROI. The shape of the ROI is not limited to quadrilaterals, but can also be an arbitrary shape. The ROI can be defined by corners, lines or curves, etc. For example, when the parking spaces are lined up along a curved street, a curved or an approximate piecewise linear parking ROI can be defined. This process can be performed manually or automatically. In some embodiments, recognition of features within an image frame can be used to determine an ROI. For example, when a street is relatively free of vehicles or sequences of images frames allows a combined view that is relatively free of vehicles, landmarks such as curbs can be used to define the ROI. Curbs can be recognized using line identification techniques, such as Hough transforms or edge detectors. Lines having properties that can be equated to having curb features, such as running in the directing of the road and of a suitable unbroken length, can be considered to represent a curb about which an ROI can be defined. The ROI would extend above and below the curb line by an amount similar to the size of a vehicle in the image frame.

Another method for determining the ROI automatically includes searching for image features that represent static vehicles that are arrayed along the direction of a road. The ROI would be defined around these features. Additional details regarding ROI determination are set forth in commonly assigned U.S. application Ser. No. 14/033,059 (Publication No. US2015-0086071), filed Sep. 20, 2013, which is incorporated herein by reference in its entirety.

After the parking ROI is defined, a geometric transformation can be applied to the defined parking ROI to remove some view distortion or normalized for the convenience of further processing when needed. For example, in demarcated parking spaces, a normalized view can provide convenience to define each parking spot. However, this view correction is optional (not necessary) for further processing.

Process Step 50—Sample One or Multiple Lines of Data (Also Referred to Herein as Vectors of Data) from the Video Frames/Image Sequences in the Parking ROI.

Pixel values are extracted from the video frames in process step 50. In an exemplary embodiment, three lines of pixels from a given frame are extracted at time t. Each line will subsequently be incorporated into a respective stack. The extracted lines of pixel can be written as $L_i(x, y; t)$, where they are formed from pixel values at (x, y) at a time t corresponding to a given frame, for subsequent stack i. The i's index different lines extracted from the given frame t, which correspond to different respective stacks. The $L_i$ can be considered as "slices" of the ROI. As will be described below, the slices can be assembled into stacks to be jointly processed (across i) or slices can be jointly processed (across i), and the resulting output assembled into stacks.

In general, the line can be of any spatial form, not needing to correspond to a row or column, or a straight angled line. The line generally samples pixels in the ROI. If the ROI curves, as in a curved road, it can be beneficial to curve the line accordingly. If the ROI exists in separated segments, the line can have gaps over these separations. The line can also be a collection of spatially diffuse samplings over the various ROI regions. For instance, they may be formed as a cluster around the center of a demarcated parking spot. The lines can be of any thickness. The pixel values could be local averages, medians, downsampled values, or some similar processed value.

It should be appreciated that in subsequent steps occupancy detection is performed by looking for spatial differences, where similarity will indicate unoccupied and significant difference will indicate occupancy. Thus, two exemplary approaches for extracting data have been found useful.

In a first approach extraction is performed on regions of the images over areas that are relatively uniform spatially when unoccupied. For example, when extracting horizontal lines from a street image for on-street parking, the lines can fall substantially on areas with little vertical difference, such as different portions of a parking lane. When a vehicle occupies the lane, one horizontal line may lie on wheel, another on the doors, and the third on the windows. Vehicle occupancy in this approach leads to significant spatial (line-to-line) differences in pixel value.

In a second approach, the lines can be normalized by their unoccupied values. In operation, each extracted line can undergo normalization by operations such as background subtraction or division using unoccupied pixel values that may have been acquired at set up or acquired and updated during operation to adjust for factors such as illumination changes. The normalization would result in little spatial variation when the overall region was unoccupied.

In other embodiments, the selection of lines can be automatic, such as sampling lines evenly distributed across the parking ROI, or manually, such as specifying each line by using mouse or other tools through a user interface.

Process Step 52—Stack the Extracted Lines to Form One or More Spatiotemporal (ST) Images Stacking the extracted lines is generally an assembling, ordering, or indexing operation, generally by time t. The resulting stack is also commonly called an image, as in "spatiotemporal image." In this disclosure, these terms are used synonymously. A stack can be written as $ST(L_i(x, y; t)$ or $ST_i(s,t)$, where i is the stack-to-stack index and s is a spatial index.

Process Step 54—(Optional) Perform Temporal or/and Spatial Noise Reduction on the ST Images For both on-street parking and parking lot scenarios, there are different kinds of noises exist, such as vehicles passing by on the drive lane, humans walking across the street, background lighting change, tree shadows, garbage on the ground, etc. Simple temporal or/and spatial noise reduction operations can be applied to the ST images before further processing. In an embodiment, median filtering is performed along the spatial dimension and the temporal dimension to reduce both the temporal and spatial noise presented in the ST images. This step is optional, but in some applications improves efficiency and/or accuracy of occupancy detection.

Process Step 56—Perform Joint Chromatic Transformation to Reduce Illumination Variations in the ST Images.

Illumination variation is one of the major factors that affect the robustness of the computer vision algorithms, especially for outdoor scenarios. In parking occupancy detection applications, to handle illumination variations is especially important since a parking occupancy event could span over a very long period and the daylight and nightlight are very different. Even during a short period, the lighting condition could change dramatically, for example, changing from cloudy to sunny or rainy, etc.

In an exemplary embodiment, a joint chromatic transformation is performed using three ST images to reduce the illumination variations. The transformation can include the following steps:

a redefinition is performed on the three image slices taken from the video at a Region of Interest (ROI) or the three spatiotemporal images (stacks) formed from these slices. The redefinition is performed by putting the three stacks/slices into respective RGB color channels. A combination of the stacks can be considered a color spatiotemporal image, where the color does not reflect the original pixel color in the video, but the difference between the three separate spatiotemporal images. The redefined three stacks can be written:

$ST(L_1(x,y;t)=ST_1(s,t)=ST_R(s,t) \rightarrow R(ST_R(s,t))$ $ST(L_2(x,y;t)=ST_2(s,t)=ST_G(s,t) \rightarrow G(ST_G(s,t))$ $ST(L_3(x,y;t)=ST_3(s,t)=ST_B(s,t) \rightarrow B(ST_B(s,t))$ It should be appreciated that a combined RGB raster line in this stack will have a more neutral color when the pixel values are similar slice to slice, and will be more chromatic for pixels values in the slices that have greater difference. In addition, as lightness of a scene changes due to an ambient conditions such as sun angle, cloud cover, etc., each of R, G and B will increase/decrease at similar rates. Hence, illumination changes will be reflected in the overall lightness of the combined RGB pixels, but will not significantly vary the color saturation or hue.

The RGB image is transformed to a device independent color space having a lightness coordinate hue-saturation-value (HSV) and the V channel is normalized to suppress global illumination fluctuations and emphasize spatial differences through the chromatic variation. Note that transformations from, e.g., Cyan, Magenta, Yellow (CMY) to e.g., L*a*b*, HSL, Luv, . . . or other color spaces could alternatively be used.

By way of example, the following formulas can be used to convert RGB to HSV. The spatial argument and line notation is suppressed to simplifying writing of the formulas $R'=R(\bullet)/255$ $G'=G(\bullet)/255$ $B'=B(\bullet)/255$ $Cmax = \max(R',G',B')$ $Cmin = \min(R',G',B')$ $\Delta = Cmax - Cmin$ Hue Calculation:

$$H = \begin{cases} 60° \times \left(\frac{G'-B'}{\Delta} \mod 6\right) & , Cmax = R' \\ 60° \times \left(\frac{B'-R'}{\Delta} + 2\right) & , Cmax = G' \\ 60° \times \left(\frac{R'-G'}{\Delta} + 4\right) & , Cmax = B' \end{cases}$$

Saturation Calculation:

$$S = \begin{cases} 0 & , \Delta = 0 \\ \frac{\Delta}{Cmax} & , \Delta <> 0 \end{cases}$$

Value Calculation:

$V = Cmax$

Performing the Color Space Transformation Yields New Stacks $H(R(ST_R(s,t)),G(ST_G(s,t)),B(ST_B(s,t)))$ $S(R(ST_R(s,t)),G(ST_G(s,t)),B(ST_B(s,t)))$ $V(R(ST_R(s,t)),G(ST_G(s,t)),B(ST_B(s,t)))$ It will be appreciated that transformations to other color spaces are also possible.

In some applications, V may not be needed unless there is a desire to create a displayable ST image. When desiring a display for applications such as debugging, or demonstration, V is set equal to some mid-rage value (e.g., let $\tilde{V}=128$ out of 0-255) and convert back to RGB space. In some embodiments, conversion back to RGB may be performed for the subsequent occupancy detection via color difference.

Process Step 58—Analyze the ST Images to Obtain the Occupancy Data in the Corresponding Parking ROI There are several options for computing color difference or chromatic strength, which would correspond to occupancy. The following are paragraphs cover several exemplary approaches for occupancy detection.

Example 1

In a first approach, the S value for each pixel or group of pixels can be compared to a threshold. If S is below the threshold, then that pixel in the ST image is interpreted to be relatively neutral in color, which means that the original spatial differences were slight, further implying non-occupancy. The converse is true for S above the threshold.

Example 2

In a second approach, a computer color difference or strength comparison is performed by calculating difference across channels.

Figure 3:
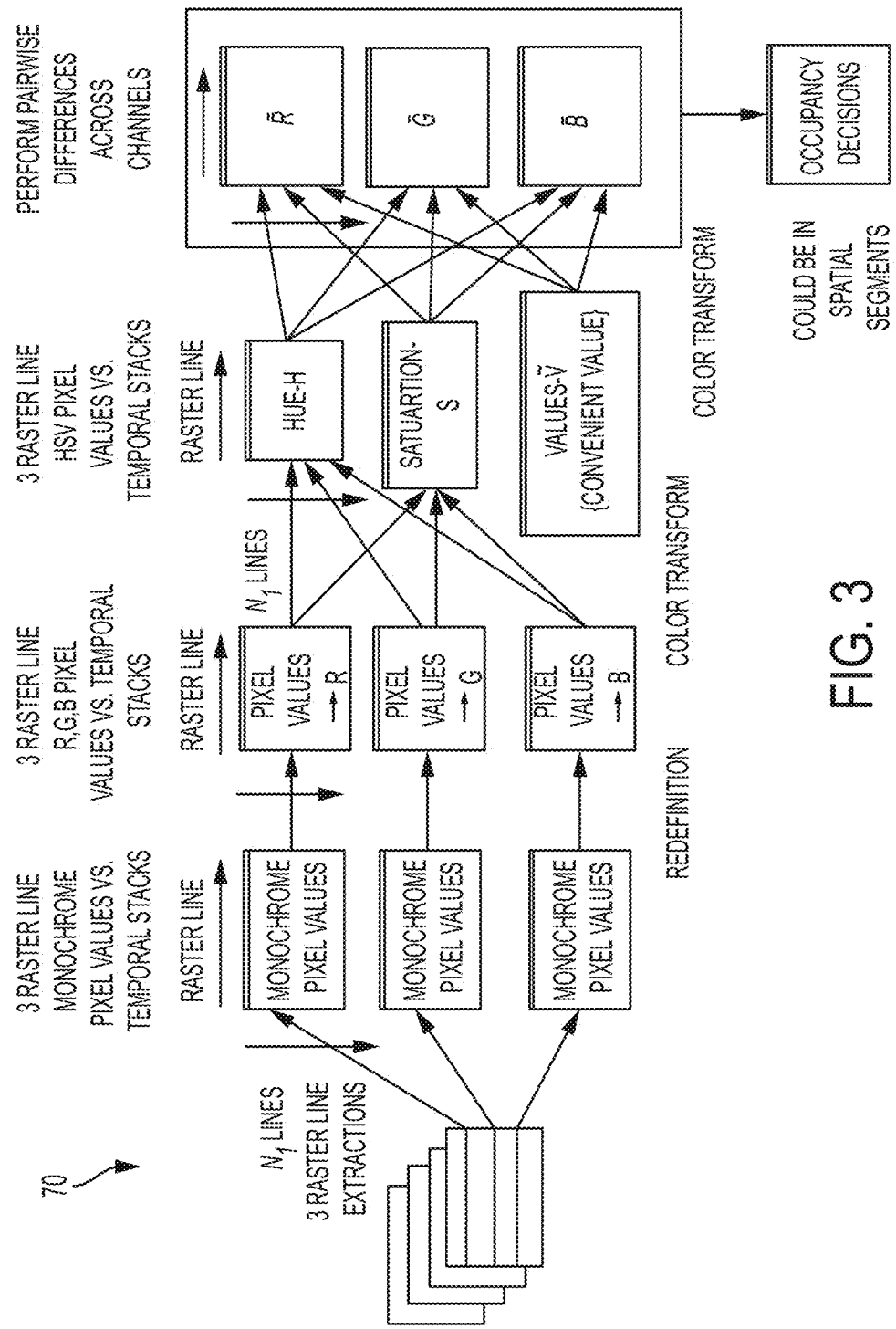
FIG. 3 is a process flow diagram illustrating an exemplary image processing technique in accordance with the present disclosure.

With reference to FIG. 3, an exemplary embodiment 70 is illustrated wherein HSV, or generally the transformed space, with normalized lightness (e.g., $\tilde{V}$) is transformed to a space where channel differences can be used to determine color strength (occupancy). For example, $$C = \tilde{V} \times S$$

$$X = C \times (1 - |(H/60°)\mathrm{mod}2 - 1|)$$

$$m = \tilde{V} - C$$

$$(R', G', B') = \begin{cases} (C, X, 0) & , 0° \leq H < 60° \\ (X, C, 0) & , 60° \leq H < 120° \\ (0, C, X) & , 120° \leq H < 180° \\ (0, X, C) & , 180° \leq H < 240° \\ (X, 0, C) & , 240° \leq H < 300° \\ (C, 0, X) & , 300° \leq H < 360° \end{cases}$$

$$(\dot{R}, \overline{G}, \dot{B}) = (R' + m, G' + m, B' + m)$$

Pixel-wise or area-wise differences across $\dot{R}(ST_R(s,t))$, $\overline{G}(ST_G(s,t))$, $\dot{S}(ST_B(s,t))$ indicate color strength (saturation), which can be determined by calculations such as the maximum or summed magnitude of all pairwise differences. These example spaces are not intended to be limiting.

Another example of a suitable transformed space is L*a*b*, where chromatic strength could be calculated from the magnitude of a* and b*. If transforming to a space for determining occupancy using via channel-to-channel difference, CMY (Cyan, Magenta, Yellow) could be used.

However the color difference is performed, accuracy is generally improved if size (in the ST space) is taken into account. For instance, morphological operations such as openings and closing can remove color difference or occupancy decisions that span too short a time or too little space.

Occupancy is often segmented in spatial units, such as parking stalls or seats in a stadium. To suppress noise, the occupancy detection formulas can calculate the occupancy within these spatial units. If the number of positive occupancy decisions covers a sufficient portion of the space, a positive occupancy decision can be made for that unit. The converse is true for too small a space in the unit classified as occupied.

Example 3

In a third approach, when multiple ST images are obtained, the differences between two or more ST images can be used for occupancy determination. An exemplary way to perform this approach includes determining the maximum absolute difference (per pixel wise) between all ST images. The value of the absolute difference between all ST images will reflect the occupancy state in the parking space. A simple threshold can be used to find the occupied spaces.

Example 4

In a fourth approach, when multiple ST images are obtained, the differences between two or more ST images can be used for occupancy determination. An exemplary way to perform this approach includes subtracting one ST image from the other. The value of the absolute difference between two ST images will reflect the occupancy state in the parking space. A simple threshold can be used to find the occupied spaces.

Example 5

In a fifth approach, strong horizontal intensity changes in the ST images can be detected which are most likely corresponding to the events when vehicles come to park and leave the parking spot. An exemplary way to perform this approach includes removing spurious horizontal edges caused by lighting changes or other noises, and determining the occupancy state when an event (strong horizontal intensity change) is detected. An initialization specifying the occupancy state at the beginning may be needed to ensure proper detection of the intensity change.

Figures 5A, 5B:
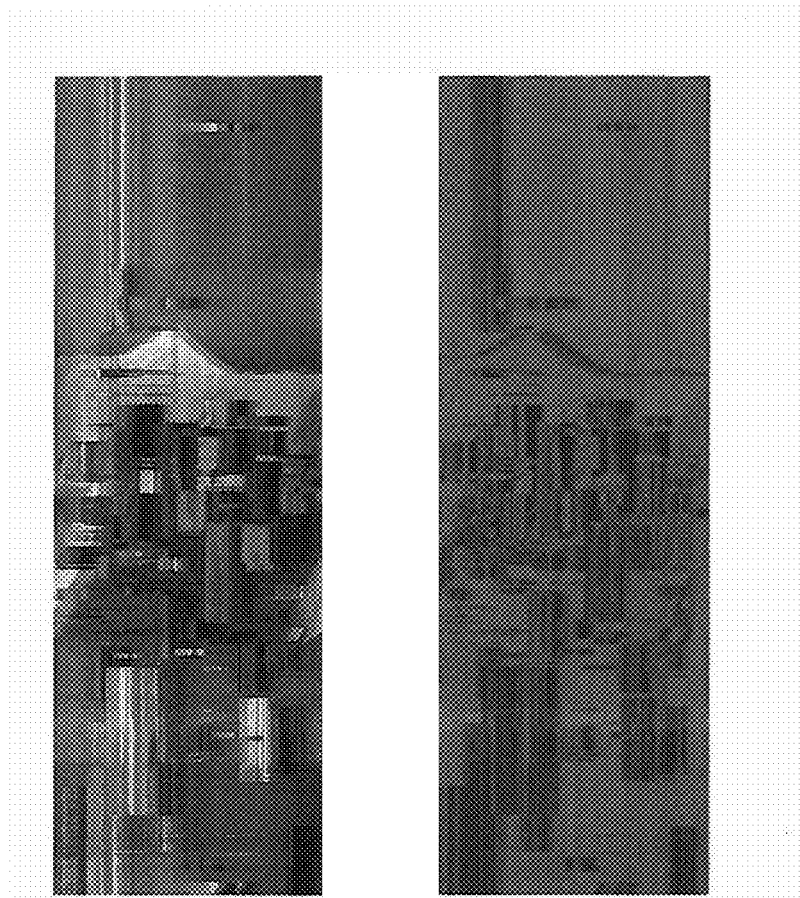
FIG. 5(A) is an unadjusted spatiotemporal image generated from a sequence of images similar to FIG. 4(B)
FIG. 5(B) is an adjusted spatiotemporal image generated from a sequence of images similar to FIG. 4(B)
Figure 6:
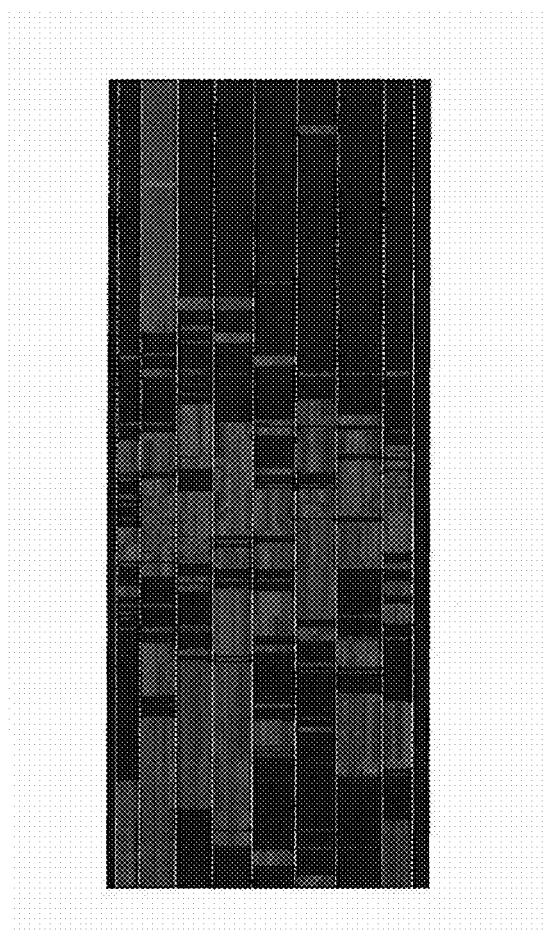
FIG. 6 is a segmented version of the spatiotemporal image of FIG. 5(B) illustrating occupancy determinations.

In FIGS. 4-6, exemplary images from a sample on-street parking occupancy system implementing a method in accordance with the present disclosure are shown. This example employs Example 1 described above for process step 58 to obtain the occupancy data in the corresponding parking ROI Significantly, the accuracy is comparable (about the same) to machine learning based methods that require training specifically for each different view. Moreover, in one embodiment of the present disclosure it was shown to process a 12 hour video within 5 minutes (at a one minute checking rate) on a single laptop while a particular machine learning based method required around 3 hours for the same task.

Figure 4A:
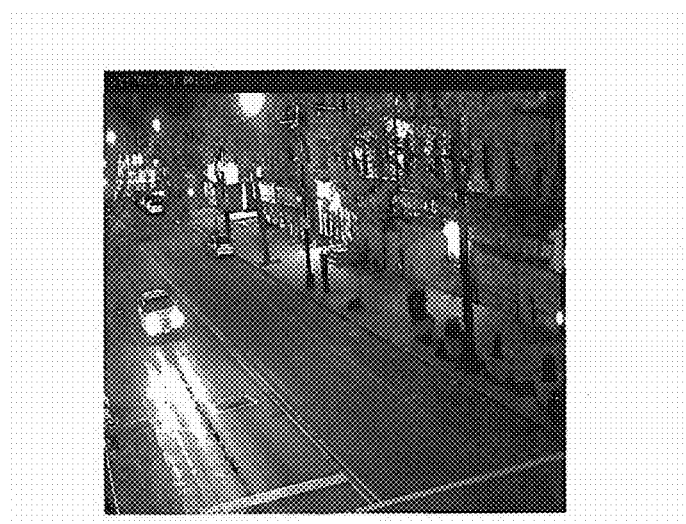
FIG. 4(A) is an exemplary image of a public street including parking stalls suitable for processing in accordance with aspects of the present disclosure.
Figure 4B:
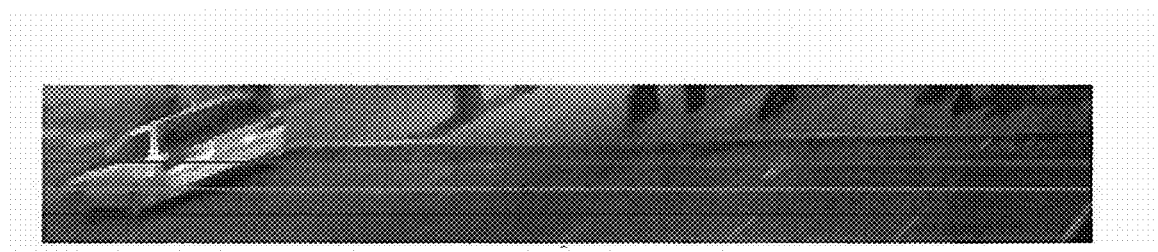
FIG. 4(B) is a corrected view of a region of interest of the image of FIG. 4(A) including the parking stalls.

FIG. 4(A) shows the defined parking ROI. FIG. 4(B) shows the geometrically transformed ROI from which raster lines are extracted to form the stack. In the exemplary implementation, the three lines are used to form an RGB raster line. That is, each raster line is redefined as an R, a G or B raster line. Details of this transformation were given above. In FIG. 4(B), the lines are color coded to represent the color channels that will be used in their respective redefinition. As discussed above, an RGB to HSV transformation (a type of fusion of information between the channels) is performed and the V normalized, which aids in accuracy of the occupancy detection.

FIGS. 5(A) and 5(B) show stacks (ST images) formed from the RGB lines of FIG. 4(B). For comparison, FIGS. 5(A) and 5(B) show the visual difference between using (FIG. 5B) and not using (FIG. 5A) the fusion to HSV and lightness normalization method disclosed above.

In FIG. 6, the image of FIG. 5(A) is segmented spatially, where the segments correspond to parking stalls. This is not a necessary step, but can improve accuracy of occupancy decisions when fixed parking stall locations are known. In this example, change from a background state was used to determine occupancy. The blue bar (line segment) is an example showing where to find the corresponding occupancy data for a parking stall. A 2D parking stall is mapped to one line segment in the ST images. The blue bar in the upper left indicates an example zone over the fraction of the stall appears to be occupied. In this Figure, non-occupied decisions are shown in black.

Figure 7:
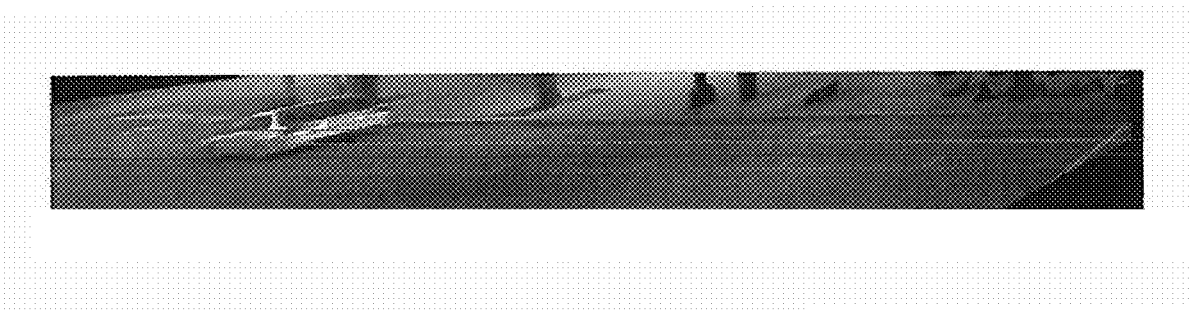
FIG. 7 is another exemplary image of a public street including parking stalls suitable for processing in accordance with aspects of the present disclosure.
Figure 8A:
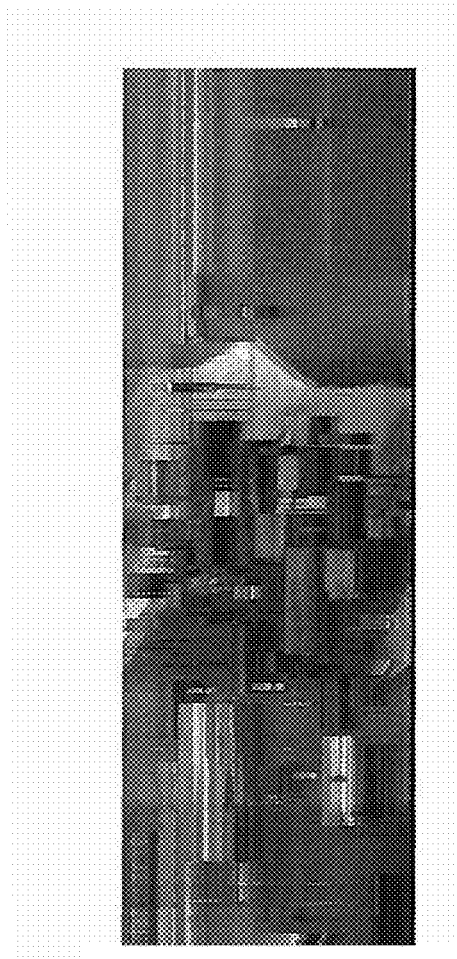
FIG. 8(A) is an unadjusted spatiotemporal image generated from a sequence of images similar to FIG. 7.
Figure 8B:
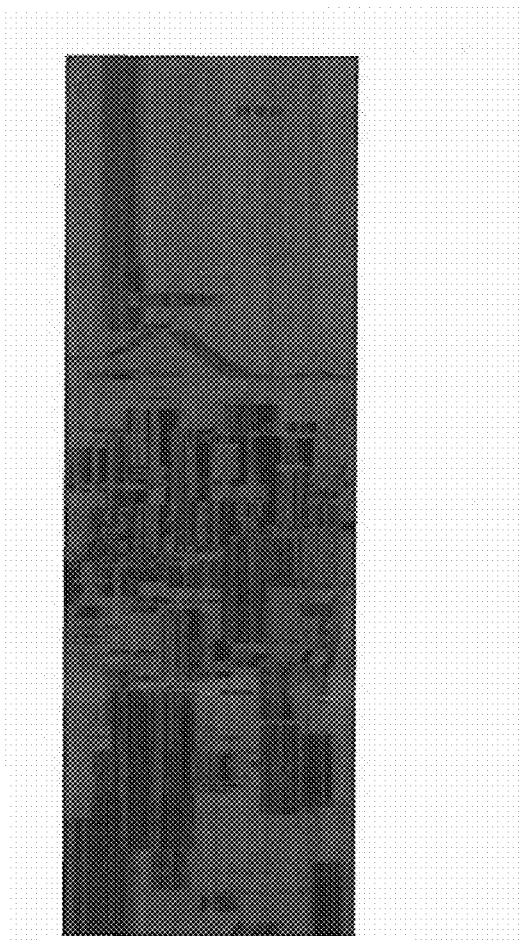
FIG. 8(B) is an adjusted spatiotemporal image generated from a sequence of images similar to FIG. 7.
Figure 9:
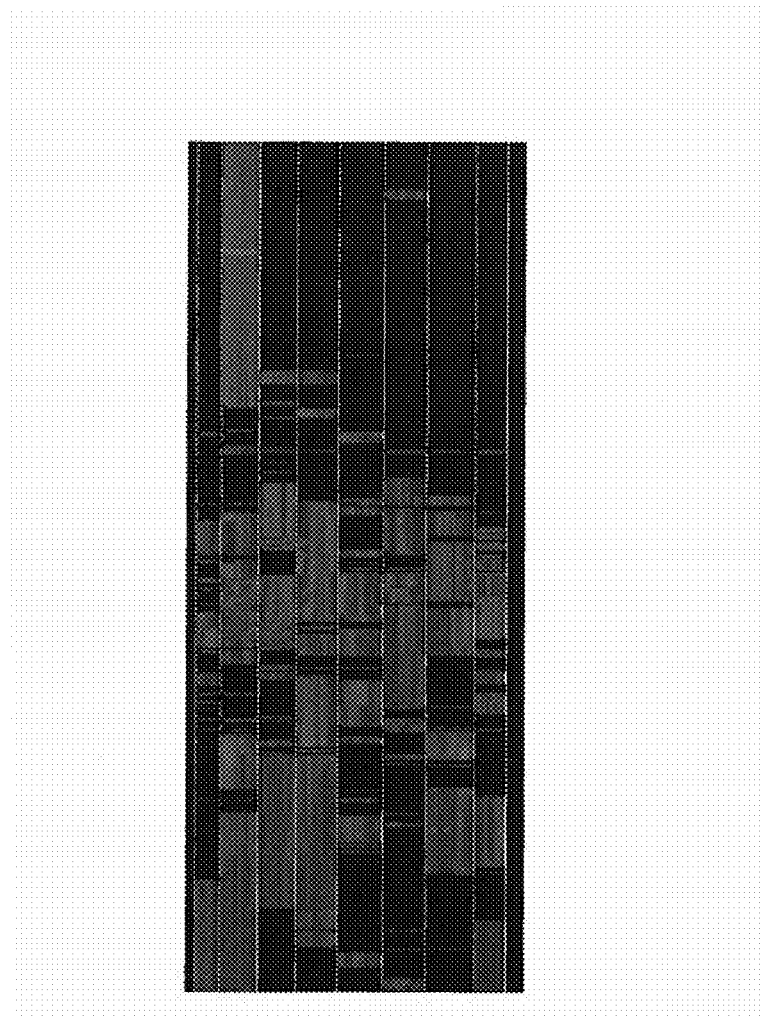
FIG. 9 is a segmented version of the spatiotemporal image of FIG. 8(B) illustrating occupancy determinations.

FIGS. 7-9 illustrate another example of the present disclosure that employs Example 3 described above for process step 58 to obtain the occupancy data in the corresponding parking ROI.

FIG. 7 shows a frame (previously geometrically transformed) from which raster lines are extracted to form the stack. In this implementation the three lines are used to form an RGB raster line. That is, each raster line is redefined as an R, a G or B raster line. Details of this transformation are set forth previously. The lines have been color coded to represent the color channels that will be used in their respective redefinition. An RGB to HSV transformation (a type of fusion of information between the channels) is applied and the V normalized, which aids in accuracy of the occupancy detection.

FIGS. 8(A) and 8(B) show stacks (ST images) formed from the RGB lines of FIG. 7, wherein FIG. 8(A) does not include the fusion to HSV and lightness normalization method disclosed herein.

In FIG. 9, the image of FIG. 8(B) is segmented spatially, where the segments correspond to parking stalls along the streetside. This is an optional step, but can improve accuracy of occupancy decisions when fixed parking stall locations are known. In this example, change from a background state is used to determine occupancy. The blue bar in the upper left indicates an example zone over which is calculated the fraction of the stall appears to be occupied. In this figure, non-occupied decisions are indicated in black.

Figure 10:
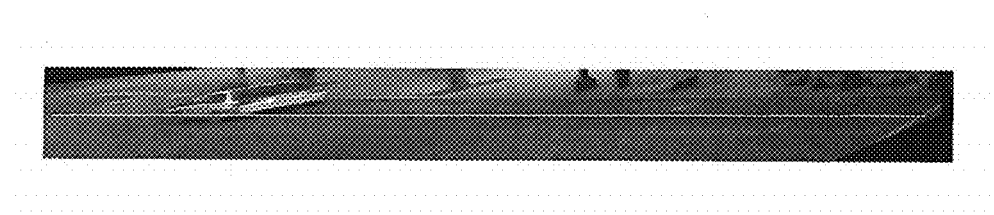
FIG. 10 is another exemplary image of a public street including parking stalls suitable for processing in accordance with aspects of the present disclosure.

FIGS. 10-12 illustrate still another example wherein one raster line in a parking ROI is used to determine occupancy. This example employs Example 5 describe above for process step 58 to obtain the occupancy data in the corresponding parking ROI.

Figure 11A:
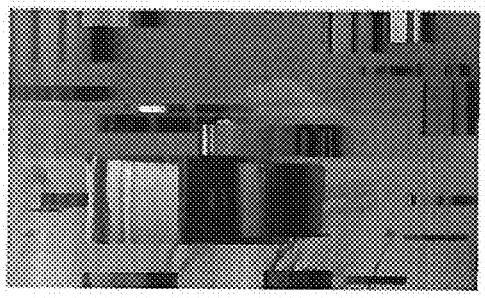
FIG. 11(A) is an unadjusted spatiotemporal image generated from a sequence of images similar to FIG. 10.
Figure 11B:
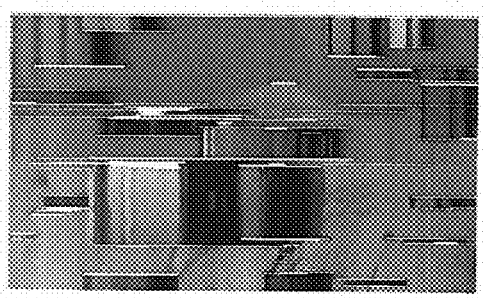
FIG. 11(B) is an adjusted spatiotemporal image generated from a sequence of images similar to FIG. 10.

FIG. 10 shows a monochromatic image wherein a single line of data is extracted. FIGS. 11(A) and 11(B) are stacks obtained from the single line depicted in FIG. 10 taken from a plurality of images, as described above. Occupancy change or pattern/feature/texture detection is performed on the monochrome ST image of FIG. 11(A). Change detections (e.g., horizontal edge segments corresponding to car parking, leaving, noise, etc.) are shown as white bars in FIG. 11(B).

Figure 12A:
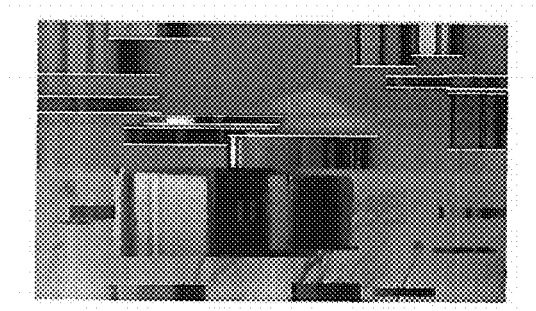
FIG. 12(A) is FIG. 11(A) with noise reduction.
Figure 12B:
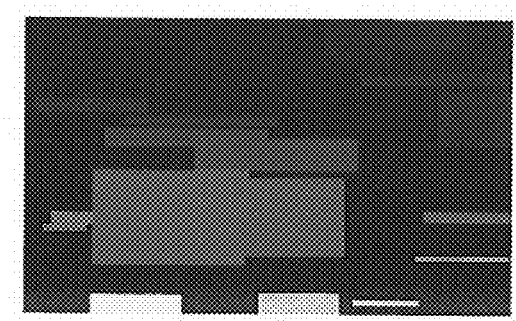
FIG. 12(B) shows the final occupancy determinations.

FIG. 12A shows FIG. 11(A) with some noise reduction. In this instance, noise refers to occupancy change decisions that are not logic for some reason, such as spanning too short of a spatial extent. FIG. 12(B) shows the final occupancy decisions wherein each color (other than the deep blue background color) rectangle region shown when a car parked (from vertical coordinates) and where it parked (from horizontal coordinates).

Compared to the previous machine learning based parking occupancy detection framework of the prior art, the new spatiotemporal framework set forth in this disclosure has the following advantages: 1) computationally much faster while achieving similar performance (e.g., greater than 30 times faster than the previous machine learning based method); 2) more memory efficient; 3) better scalability on parking types, street shape and camera view angles (parallel or angled parking, straight or curved street, high or low camera positions, etc.); 4) broader applications on different occupancy detection scenarios including on-street parking detection, parking lot occupancy detection, heavy goods vehicles (HGV) parking occupancy detection without re-training.

It should further be appreciated that the present disclosure sets forth a system and method does not rely upon sample training images and, therefore, is not specifically trained to detect a particular object. Instead, the system and method of the present disclosure is adaptable to detection of a wide range of objects occupying a monitored space. Accordingly, the system and method of the present disclosure can be used for non-vehicle occupancy detection, such as seat occupancy detection at stadium, classroom and theatre, etc.

Figure 13:
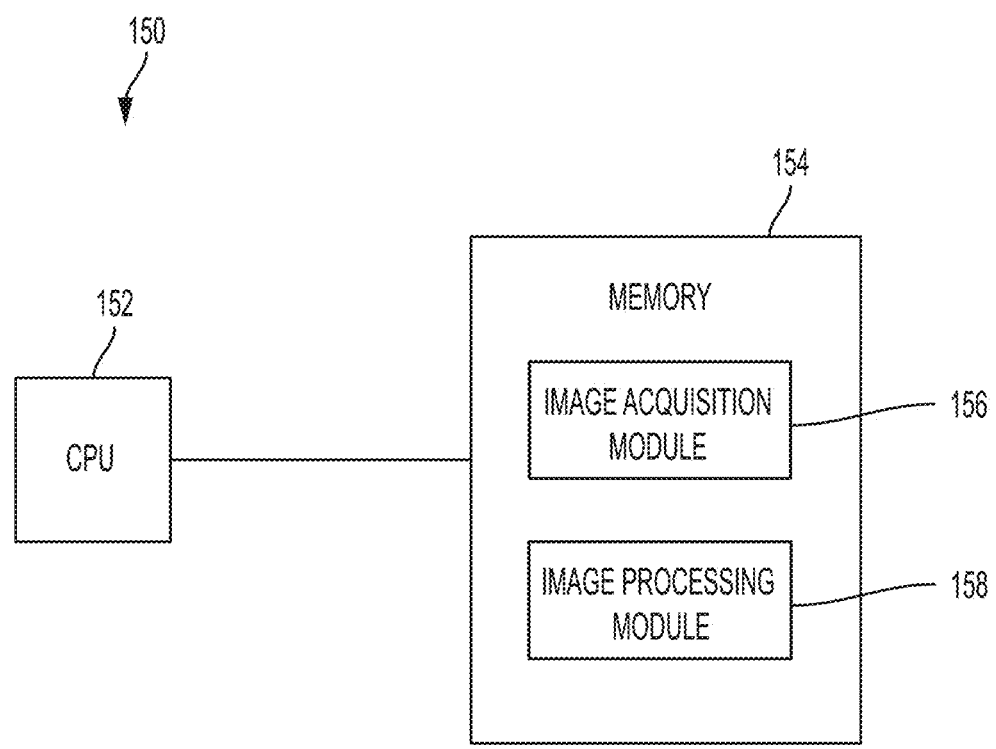
FIG. 13 is a block diagram of an exemplary system in accordance with the present disclosure.

As noted above, a single laptop computer can be configured to process image frames in accordance with the exemplary methods set forth in this disclosure. Of course, it should be understood that a wide variety of devices can be configured to perform aspect of the present disclosure. For example, in FIG. 13, a basic system 150 includes a CPU 152 operatively connected to a memory 154. Memory 154 contains an image acquisition module 156 and an image processing module 158. It will be appreciated that the image acquisition module 156 is configured to acquire a sequence of images from an image source, such as images stored in memory 154 or received from a camera or other device. Image processing module 158 contains the image processing algorithm for processing the images in accordance with the present disclosure. It should also be appreciated that the CPU 152 and memory 154 can be a standalone system or can be integrated into an existing image processing system, such as imaging systems for monitoring parking areas as noted above.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method for detecting vehicle occupancy of a plurality of parking spaces comprising:
   acquiring a sequence of images of the plurality of parking spaces;
   extracting at least one vector of data from the same location in each of the images;
   generating a plurality of spatiotemporal images, each spatiotemporal image comprised of vectors of data extracted from the same location in each of the sequence of images; and
   analyzing the plurality of spatiotemporal images to obtain vehicle occupancy data of each of the plurality of parking spaces;
   wherein the analyzing includes calculating a color difference of respective at least one pixels in at least two of the spatiotemporal images, determining the maximum absolute difference per pixel between at least two spatiotemporal images and comparing the difference to a threshold to obtain occupancy data, or subtracting a first spatiotemporal image from a second spatiotemporal image and comparing the difference to a threshold to obtain occupancy data.

2. The computer implemented method of claim 1, wherein the extracting at least one vector of data from the same location in each of the images further comprises extracting at least three vectors of data from substantially different portions of each respective image.

3. The computer implemented method of claim 2, further comprising defining the three vectors of data to be three color data components, transforming the three color data components to a device independent color space, and analyzing non-lightness components of the transformed data to determine vehicle occupancy of the plurality of parking spaces.

4. The computer implemented method of claim 2, further comprising defining the three vectors of data to be respective red, green, and blue color data components, transforming the color data components to a hue-saturation color space, and analyzing the hue-saturation components of the transformed data to determine vehicle occupancy of the plurality of parking spaces.

5. The computer implemented method of claim 1, further comprising performing temporal noise reduction on the at least one of the plurality of spatiotemporal images prior to the analyzing.

6. The computer implemented method of claim 5, further comprising performing spatial noise reduction on the at least one of the plurality of spatiotemporal images prior to the analyzing.

7. The computer implemented method of claim 1, wherein the analyzing includes comparing a saturation value of at least one pixel of the spatiotemporal image to a threshold value and, if above the threshold, generating an output indicative of occupancy of the space corresponding to the at least one pixel.

8. The computer implemented method of claim 1, wherein the analyzing includes detecting horizontal intensity changes in at least one of the plurality of spatiotemporal images.

9. The computer implemented method of claim 1, wherein a time interval between individual images of the sequence of images is variable.

10. A system for video-based detection occupancy of a space, the system comprising a memory in communication with a processor configured to:
acquire a sequence of images of the space;
extract at least one vector of data from the same location in each of the images;
generate a plurality of spatiotemporal images, each spatiotemporal image comprised of vectors of data extracted from the same location in each of the sequence of image; and
analyze the plurality of spatiotemporal images to obtain occupancy data of the space;
wherein the processor is further configured to analyze the plurality of spatiotemporal images by calculating a color difference of respective at least one pixels in at least two of the spatiotemporal images, determining the maximum absolute difference per pixel between at least two spatiotemporal images and comparing the difference to a threshold to obtain occupancy data, or subtracting a first spatiotemporal image from a second spatiotemporal image and comparing the difference to a threshold to obtain occupancy data.

11. The system of claim 10, wherein the processor is further configured to extract at least three vectors of data from substantially different portions of each respective image.

12. The system of claim 11, wherein the processor is further configured to define the at least three vectors of data to be three color data components, transform the three color data components to a device independent color space, and analyze non-lightness components of the transformed color data components to determine vehicle occupancy of the plurality of parking spaces.

13. The system of claim 11, wherein the processor is further configured to define the at least three vectors of data to be respective red, green, and blue color data components, transform the color data components to a hue-saturation color space, and analyze the hue-saturation components of the transformed color data components to determine vehicle occupancy of the plurality of parking spaces.

14. The system of claim 10, wherein the processor is further configured to perform temporal noise reduction on at least one of the plurality of spatiotemporal images prior to the analyzing.

15. The system of claim 10, wherein the processor is further configured to perform spatial noise reduction on at least one of the plurality of spatiotemporal images prior to the analyzing.

16. The system of claim 10, wherein the analyzing includes comparing a saturation value of at least one pixel of at least one of the spatiotemporal images to a threshold value and, if above the threshold, generating an output indicative of occupancy of the space corresponding to the at least one pixel.

17. The system of claim 10, wherein the analyzing includes detecting horizontal intensity changes in at least one of the plurality of spatiotemporal images.

* * * * *